No. 762,023. PATENTED JUNE 7, 1904.
L. H. BROWN.
FILLING-END HOLDER FOR AUTOMATIC LOOMS.
APPLICATION FILED MAR. 7, 1904.
NO MODEL.
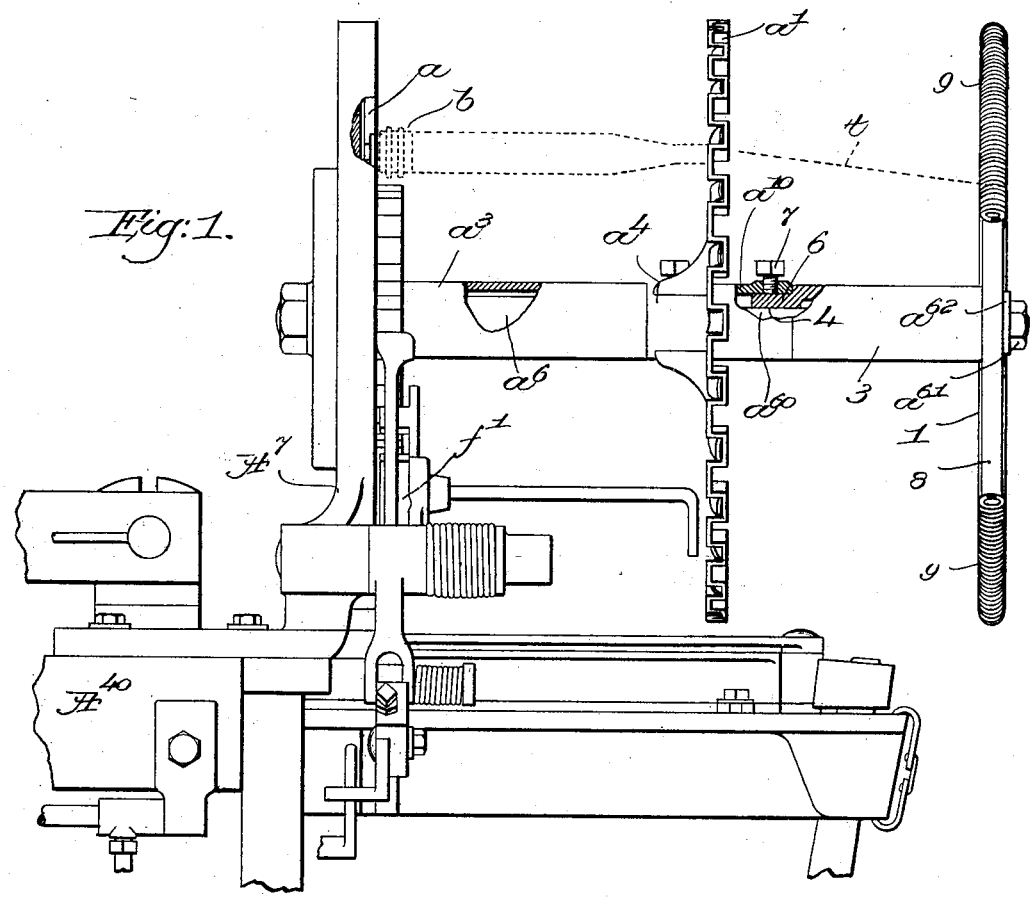
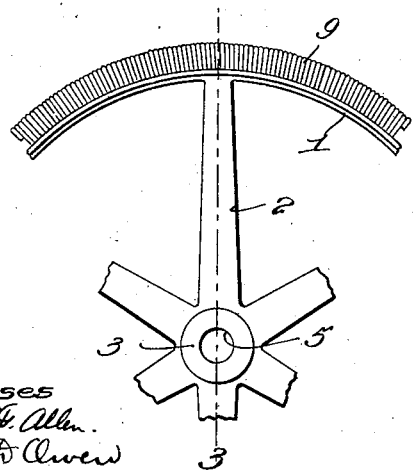
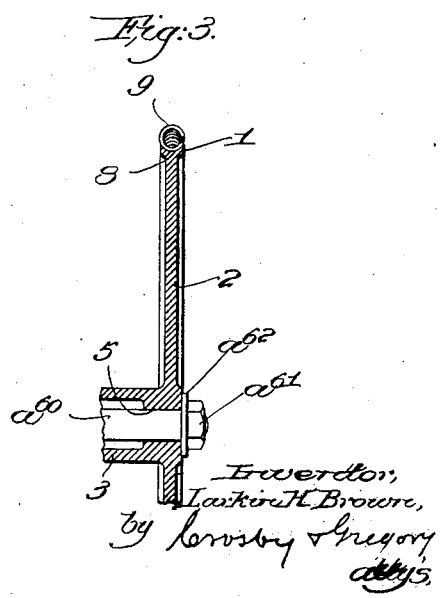

No. 762,023. Patented June 7, 1904.

UNITED STATES PATENT OFFICE.

LARKIN H. BROWN, OF KNOXVILLE, TENNESSEE, ASSIGNOR TO DRAPER COMPANY, OF HOPEDALE, MASSACHUSETTS, A CORPORATION OF MAINE.

FILLING-END HOLDER FOR AUTOMATIC LOOMS.

SPECIFICATION forming part of Letters Patent No. 762,023, dated June 7, 1904.

Application filed March 7, 1904. Serial No. 196,825. (No model.)

*To all whom it may concern:*

Be it known that I, LARKIN H. BROWN, a citizen of the United States, and a resident of Knoxville, county of Knox, State of Tennessee, have invented an Improvement in Filling-End Holders for Automatic Looms, of which the following description, in connection with the accompanying drawings, is a specification, like characters on the drawings representing like parts.

This invention relates particularly to looms of the "Northrop" type, wherein a reserve supply of filling-carriers or bobbins is contained in a rotatable feeder, the filling-carriers being removed singly therefrom automatically and inserted in the running shuttle to replenish the filling thereof—as, for instance, in United States Patent No. 529,940. The filling ends are led from the filling-carriers to a point beyond the outer end of the feeder and secured to hold them taut and to secure the free end of the filling when the corresponding filling-carrier is transferred to the shuttle. In the patent referred to a peripherally notched or serrated disk is mounted on the outer end of the feeder, and the filling ends are led over the periphery of said disk and then wrapped about a central stud in a manner well known to those skilled in the art.

My present invention has for its object the production of a filling-end holder possessing certain novel and useful features, which are fully described in the subjoined specification and particularly pointed out in the following claims.

Figure 1 is a front elevation, partly broken out, of a filling-feeder of the type hereinbefore referred to with a filling-end holder applied thereto embodying one form of my invention. Fig. 2 is a detail in end elevation of a portion of the holder, and Fig. 3 is a sectional detail thereof on the line 3 3, Fig. 2.

Referring to Fig. 1, the stand $A^7$, mounted on the breast-beam $A^{40}$ at one side of the loom, the stud $a^6$, extended outward horizontally from the stand to support the filling-feeder, said feeder comprising disks $a\ a'$, having their hubs $a^3\ a^4$ connected and rotatably mounted on said stud, and the transferrer $f'$ may be and are all substantially as in the patent referred to. The filling-carriers or bobbins $b$, Fig. 1, are supported at head and tip by the disks $a\ a'$, respectively, in well-known manner, the feeder being rotating intermittingly by any suitable means, forming no part of my invention.

In accordance with my present invention I provide an annular support 1, which is conveniently made as the rim of a wheel or spider connected by radial arms 2 with an elongated hub 3, internally reduced in diameter at 4, Fig. 1, and at 5, Fig. 3, to slide onto an extension $a^{60}$ of the stud $a^6$. The disk $a'$ of the feeder is shown in Fig. 1 as provided with a tubular boss $a^{10}$ on its outer face, concentric with the extension $a^{60}$, said boss being adapted to receive the externally-reduced end 6 of the hub 3, a set-screw 7 firmly securing the parts together. A nut $a^{61}$ is screwed onto the outer end of the extension to prevent movement of the feeder and support longitudinally along the stud $a^6$ and its extension, a washer $a^{62}$ being interposed between the nut and the adjacent end of hub 3.

The annular support 1 is provided with a peripheral groove or seat 8, in which is seated a spirally wound or coiled wire 9, and in practice this wire spiral extends completely around the periphery of the support 1, a portion of the spiral being omitted in Fig. 1 to show the groove or seat 8. The spiral is made of light flexible wire and so wound that the adjacent coils or turns are in contact, yet permitting ready separation temporarily.

Referring to Fig. 1, the filling end $t$ from the filling-carrier is led over the edge of the disk $a'$ of the feeder and carried to the support 1, said filling end then being drawn or pushed down between two adjacent coils of the spiral 9. The resiliency or elasticity of the spiral causes such coils to nip or hold firmly but yieldingly the end of filling thus inserted without further fastening means, the device thus forming a very simple and effective holding device for the filling ends, yet permitting sufficient give to the filling to prevent breakage when the shuttle is shot out of the box after transfer of filling. Inasmuch as the spiral is continuous around the periphery of the support, it will be manifest that the filling ends can be inserted in or caused to be engaged and held by the spiral at any point, so that the angle of the filling end between the feeder and said support can be made as great or as small as desired.

Having fully described my invention, what I claim as new, and desire to secure by Letters Patent, is—

1. A rotatable filling-feeder for automatic looms, and a filling-end holder mounted thereon comprising an annular support at the outer end of the feeder, and a spirally-wound wire surrounding the periphery of the support, to receive and hold yieldingly between adjacent coils the filling ends led from filling-carriers contained in the feeder.

2. A filling-end holder for rotatable filling-feeders, comprising an annular support adapted to be attached to the outer end of and to rotate with the feeder, and continuous yielding holding means for the filling ends, mounted wholly upon the periphery of said support.

In testimony whereof I have signed my name to this specification in the presence of two subscribing witnesses.

LARKIN H. BROWN.

Witnesses:
   CHAS. H. LOVETT,
   ADRIAN BRADLEY.